Jan. 11, 1944. E. L. D'OUVILLE ET AL 2,338,711
ALKYLATION OF AROMATICS
Filed Oct. 30, 1941
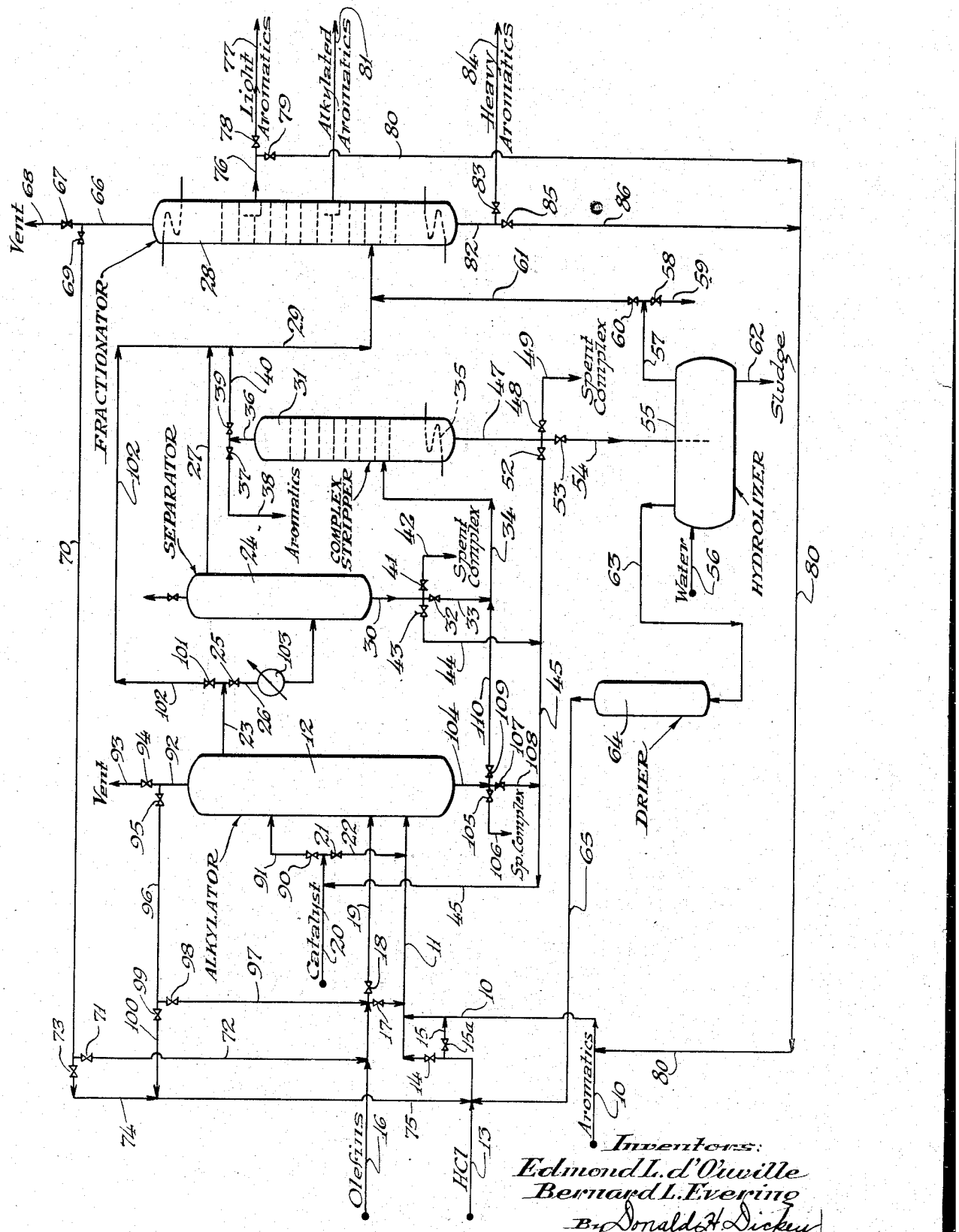
Inventors:
Edmond L. d'Ouville
Bernard L. Evering
By Donald H. Dickey
Attorney Patented Jan. 11, 1944

2,338,711

UNITED STATES PATENT OFFICE 2,338,711

ALKYLATION OF AROMATICS

Edmond L. d'Ouville and Bernard L. Evering, Chicago, Ill., assignors to Standard Oil Company, Chicago, Ill., a corporation of Indiana Application October 30, 1941, Serial No. 417,182

9 Claims. (Cl. 260—671)

This invention relates to the manufacture of hydrocarbons and is directed more particularly to the production of alkylated aromatics.

The alkyl derivatives of benzene and benzene homologs have assumed increased importance in view of recent commercial trends. Their use as a constituent of aviation fuels as well as in motor fuels is becoming more prominent. They are an excellent raw material for the production of synthetic resins and plastics, and by treatment with various agents can be converted into many valuable chemical compounds. Alkylated aromatics are also useful as special solvents and reaction mediums. Of the many alkyl benzenes, ethyl toluene is particularly valuable for the above-named purposes.

It is an object of this invention to provide an improved process for the production of alkylated aromatic hydrocarbons. Another object is to provide a process for the production of mixed alkyl-aryl hydrocarbons using normally gaseous olefins and aromatic hydrocarbons. It is also an object of our invention to provide a process for alkylation of aromatic hydrocarbons employing an improved aluminum halide-type alkylation catalyst. A particular object of our invention is the production of ethyl toluene by the alkylation of toluene with ethylene using our preferred catalyst. It is a further object of this invention to provide a process which will produce alkyl aromatic hydrocarbons economically and with good yields. Further objects and advantages will become apparent as the description of our invention proceeds, particularly when read in conjunction with the accompanying drawing which illustrates schematically apparatus suitable for carrying out one embodiment of our invention.

The alkylation of aromatic hydrocarbons with olefins using an aluminum halide catalyst, such as anhydrous aluminum chloride, has been known for some time. The results have not been at all attractive from a commercial point of view, due to such factors as short catalyst life, uncontrollable side reactions, poor yields, etc. For example, when an attempt is made to alkylate aromatic hydrocarbons, such as benzene or its homologs, with normally gaseous olefins using anhydrous aluminum chloride as a catalyst, the catalyst activity is quickly reduced by the hydrocarbon complexes formed therewith and the yield of alkylated aromatics in gallons per pound of catalyst employed is extremely low, which means a correspondingly high catalyst cost for the process. Moreover, pure aluminum chloride, particularly in the early stages of the reaction, fosters a number of undesirable side reactions, such as for example, polymerization of the olefinic hydrocarbons to polymers rather than alkylation of the aromatics thereby. Also, there is grave danger, unless the temperature is kept comparatively low, of cracking the feed stocks to yield large amounts of unwanted non-condensible gases as well as further olefinic materials which polymerize into undesired compounds. If the reaction temperature is kept sufficiently low so that the side reactions are minimized then the alkylation reaction takes place at such a low rate that it becomes economically unsound for commercial operation.

Various attempts have been made to modify the catalytic activity of pure aluminum halides to such an extent that they can be employed usefully in a commercial alkylation process of this type but, generally speaking, the yield of alkylated aromatic hydrocarbons, based on the feed to the reaction, is so low that the desired product becomes exceedingly expensive. Among the various modifications heretofore employed have been the use of aluminum chloride-hydrocarbon complexes formed, for example, by the reaction of anhydrous aluminum chloride with an aromatic hydrocarbon, usually in the presence of a hydrogen halide or an alkyl halide supplying hydrogen halide under the reaction conditions, or in the presence of an alkylated benzene such as isopropyl benzene. We have found that by employing an aluminum halide-hydrocarbon catalyst formed by the interaction of an aluminum halide, such as aluminum chloride, with a normally liquid paraffinic hydrocarbon, we are able to obtain increased yields of product with substantially accurate control of the type of product obtained, with good yields and long catalyst life.

Our catalyst is prepared by contacting a normally liquid hydrocarbon fraction rich in paraffinic hydrocarbons with anhydrous aluminum chloride or other suitable aluminum halide in the presence of a hydrogen halide or other substance affording a hydrogen halide under the reaction conditions at temperatures of from about 120° F. to 250° F. and at atmospheric pressure or slightly above. The hydrocarbon feed stock is preferably free of unsaturates, although up to about 2% by weight of aromatics can be present without too great a deleterious effect. Preferably, however, the aromatic content is less than 0.5% by weight during the course of the contact between the aluminum halide and the hydrocarbon feed stock. Under these conditions the aluminum halide loses separate identity and is converted to a heavy liquid form, oily in appearance and varying from light yellow to dark red or reddish brown in appearance. This complex will be referred to throughout the specification and claims as an aluminum halide-paraffinic hydrocarbon complex, or terms of a similar nature, but it is not intended to infer thereby that the hydrocarbons have been joined to the aluminum halide in paraffinic form, i. e., that they are present in the oily mixture as a saturated aliphatic hydrocarbon. The exact composition of the complex has not been ascertained but apparently the hydrocarbons do not replace the halogens in the aluminum halide metathetically since an analysis of a complex of this nature was as follows:

| | Wt. percent |
|---|---|
| Aluminum | 12.5 |
| Chlorine | 44 |
| Carbon plus hydrogen | 43.5 |
| Cl/Al | 2.7 |

From the ratio of chlorine to aluminum it will be seen that the chlorine atoms have not been replaced by hydrocarbon radicals since otherwise the ratio of chlorine to aluminum would have been of the order of 2:1 to 1:1. An attempted analysis of the hydrocarbons separated from the complex by hydrolysis was not too revealing as to their structure but did indicate that the separated hydrocarbons were of an unsaturated nature and possibly of the terpene type. The particular analysis of the complex is not important for our purpose, however, except as it serves to distinguish these catalysts from aluminum halide-hydrocarbon complexes formed by the interaction of aluminum halide with, for example, olefins or aromatics. Apparently paraffins, olefins and aromatics each form a distinct type of hydrocarbon complex with aluminum halide, these complexes differing materially in their catalytic effect as well as in physical and other chemical characteristics, and we wish to specifically exclude from use in our process the catalysts formed by the interaction of an aluminum halide with olefins, or aromatics, as well as the use of pure aluminum halide, such as anhydrous aluminum chloride.

A particularly effective catalyst has been found to be obtained when the paraffinic hydrocarbon with which the aluminum halide is reacted to form the catalyst contains at least two side chains per molecule, i. e., when highly branched paraffinic hydrocarbons are employed as the hydrocarbon feed stock to the catalyst preparation step. A catalyst of this nature has been prepared by stirring together at atmospheric pressure a quantity of anhydrous aluminum chloride with an excess of commercial isooctane at 120° F. to 140° F. until a liquid complex resulted. Gaseous hydrogen chloride was bubbled through the reaction mixture and a reflux arrangement was employed. During the complex formation large amounts of isobutane were produced and the unconverted hydrocarbon liquid contained about 50% of material boiling higher than the end point of the original isooctane. The complex itself was separated from the unreacted hydrocarbons and from unreacted aluminum chloride, which latter substance can be ultimately converted in its entirety to complex by further treatment with additional quantities of isooctane. The catalyst complex had a viscosity less than that of an SAE 50 lubricating oil and could easily be pumped through pipes, towers, etc., for intimate contact with the reacting hydrocarbons. Any branched chain paraffin, particularly those having more than six carbon atoms per molecule, are adequate for our purpose.

As a feed stock for our process we man employ aromatic hydrocarbons such as benzene, toluene, xylene, etc., either in the form of substantially pure hydrocarbons or as mixtures, either with each other or with comparatively inert materials such as straight-chain paraffinic hydrocarbons, naphthenes, etc. Fractions containing suitable aromatic hydrocarbons can be obtained from such sources as coal tar distillation, hydroforming of petroleum fractions, catalytic aromatization of light naphthas, etc. For the purpose of illustration we will refer to the use of toluene as the aromatic feed stock but it should be understood that benzene and its other homologs are equally suitable for our purpose. The normally gaseous olefinic hydrocarbons which we can employ for alkylating the aromatic hydrocarbons can be those having less than five carbon atoms per molecule, such as ethylene, propylene, and the butylenes. The olefinic hydrocarbons can be present in a substantially pure form or they can be mixtures of one or more olefins, with or without the corresponding gaseous paraffinic hydrocarbons present. These gases are advantageously obtained from the off-gases from the cracking of petroleum at high temperatures and pressures and can be suitably separated into their component parts by absorption means or other processes for fractionating the various hydrocarbons into their component fractions. A refinery "noncondensible" gas fraction, containing at least 10% ethylene together with ethane and methane and traces of higher molecular weight hydrocarbons, is eminently suitable for commercial operations. In describing our operation we will employ ethylene, which is particularly valuable for this purpose, since it is in many cases a "waste fuel."

Referring now to the drawing, toluene from any given source (not shown) enters through line 10 and passes through line 11 to alkylation reactor 12. Toluene may be obtained from coal tar distillation or from the hydroforming of petroleum naphthas or similar aromatization processes now employed for the production of additional quantities of aromatic hydrocarbons from petroleum sources. A hydrogen halide, such as hydrogen chloride can be added through line 13 which also joins line 11 prior to alkylator 12. In place of hydrogen chloride we can use any other substance affording a hydrogen halide under the reaction conditions, including alkyl halides such as ethyl chloride, propyl chloride, butyl chloride, etc. choloroform, etc. The alkyl halide corresponding to the olefin used for alkylation is preferred. We can also employ chlorine which will form hydrogen chloride with the hydrocarbons under the reaction conditions and we can even employ water which will react upon the catalyst present to liberate hydrogen halides. Throughout the specification and claims, the term "a substance affording a hydrogen halide under the reaction conditions" or similar expression is intended to include the hydrogen halides themselves as well as the various other substances just described. If desired, the hydrogen halide can be mixed directly with the aromatic feed stock prior to injection into alkylator 12, in which case valve 14 in line 13 is closed and valve 15a in line 15 which joins line 10 will be open. A mixing vessel (not shown) can be provided in which the hydrogen halide can be absorbed in the hydrocarbon feed stock under pressure, if desired. Olefins are added through line 16 and can be mixed with the toluene and hydrogen chloride in line 11 by opening valve 17, or be sent directly to the alkylator 12 by opening valve 18 in line 19. A liquid aluminum halide-paraffinic hydrocarbon complex of the type previously described can be added as catalyst through line 20 and mixed with the other reactants by opening valve 21 in line 22 which joins line 11 prior to alkylator 12. The reaction is carried out at temperatures within the range from about 50° F. to about 250° F., preferably about 175° F. to about 215° F., and under pressures of from about 15 to about 600 pounds per square inch, preferably about 200 pounds per square inch. The temperature in alkylator 12 can be maintained by means of a jacket (not shown) or other suitable arrangement about or in the reactor, or the reactor can be well insulated and one or more of the reactants and/or catalyst heated prior to their introduction to the reactor by means of a heater (not shown). Suitable mixing means can also be provided. In alkylator 12 the toluene is alkylated with the ethylene from line 16 to form ethyl toluene, the monoalkylate being the primary product, although, of course, there will be minor amounts of dialkyl aromatics, etc. formed. The alkylate together with unconverted feed stocks and catalyst are withdrawn from alkylator 12 through line 23 and directed to separator 24 by opening valve 25 in line 26.

In separator 25 the heavy catalyst is allowed to settle, leaving the alkylate together with the unreacted hydrocarbons and hydrogen halide as an upper layer. The upper layer is withdrawn through line 27 and directed to fractionator 28 through line 29. The aluminum halide-paraffinic hydrocarbon complex employed as a catalyst has the added faculty of dissolving aromatic hydrocarbons to a very considerable extent, as well as promoting the alkylation of hydrocarbons with the normal gaseous olefins present. Accordingly, it is usually desirable to recover a part, if not all, of the aromatic hydrocarbons, alkylated and unalkylated, from the catalyst. This can be done by withdrawing the catalyst with its dissolved aromatics from separator 24 through line 30 and directing it to complex stripper 31 by opening valve 32 in line 33 which joins line 34. A heating means 35 in complex stripper, or other means for distilling out the aromatic hydrocarbons is employed, the aromatics passing overhead through line 36. A reduced pressure in stripper 31 is desirable so that it is not necessary to heat the catalyst to any great extent. These latter hydrocarbons can be withdrawn by opening valve 37 in line 38 but preferably are directed to fractionator 28 by opening valve 39 in line 40 which joins line 29. The spent catalyst from separator 24 can also be discarded by opening valve 41 in line 42, or can be recycled to alkylator 12 through valve 43 and line 44 which joins line 45 leading to line 20. Valve 32 in line 33 will accordingly be closed. By the proper manipulation of valves 41, 32 and 43, it is possible to discard part of the catalyst, direct a major portion of it to complex stripper 31 and recycle a minor portion to alkylator 12.

The stripped complex from complex stripper 31 can be withdrawn through line 47 and discarded by opening valve 48 in line 49. However, it may be, and usually is, desirable to recycle this catalyst, if still active for promoting alkylation processes, to alkylator 12, which can be accomplished by opening valve 52 in line 45 leading from line 47 to catalyst input line 20.

Spent complex from line 47 can also be utilized as a source of hydrogen chloride for the reactor by treating the spent sludge with water. In order to carry out this operation the spent catalyst is directed from line 47 through valve 53 in line 54 to hydrolyzer 55 wherein it is contacted with water or steam which enters via line 56. During the course of the hydrolysis, aromatic hydrocarbons, as well as other hydrocarbons attached to the aluminum chloride, will be freed and may be withdrawn through line 57 and discarded by opening valve 58 in line 59 or fractionated with the other hydrocarbons by opening valve 60 in line 61 which joins line 29 leading to fractionator 28. The decomposed sludge, including coke-like material, aluminum oxide, etc., can be withdrawn and discarded through line 62. The hydrogen chloride formed by the hydrolysis together with any water vapors which may be present will pass overhead through line 63 to drier 64 wherein moisture is removed and then taken overhead therefrom through line 65 which joins line 13 leading to the alkylation reactor 12.

In fractionator 28, which is any conventional means for separating hydrocarbons of different boiling range, a separation can be made between a light hydrocarbon fraction including olefins together with the hydrogen chloride, the light aromatics which may be unconverted feed stock, alkylated aromatics of the desired boiling range, and heavier aromatics formed by the excess alkylation of the aromatic feed stock. The light hydrocarbons, with or without hydrogen chloride, pass overhead through line 66 and can be discarded by opening valve 67 in line 68. Preferably, however, these hydrocarbons are recycled to the alkylation zone by opening valve 69 in line 70. If the off-gases contain a predominant amount of olefins, these can be recycled to the reaction by opening valve 71 in line 72 which joins line 16. If on the other hand the gases are predominantly unused hydrogen chloride, these may be permitted to join the input hydrogen chloride by opening valve 73 in line 74 which leads to line 75 joining line 13. The light aromatics are withdrawn via line 76 and can be discarded through line 77 by opening valve 78, but preferably are recycled to the alkylation reactor by opening valve 79 in line 80 which joins line 10 leading to the alkylation reactor. The desired product of ethyl toluene is withdrawn via line 81 and sent to storage or for use for any of the previously enumerated purposes. The heavier alkylates are withdrawn via line 82 and can be discarded by opening valve 83 in line 84 or recycled by opening valve 85 in line 86 which joins line 80 leading to aromatic input line 10 for conversion to ethyl toluene.

Our alkylation process can be carried out in another manner which is also suitable for the production of alkylated aromatics. The aromatic hydrocarbons and hydrogen chloride are injected into alkylator 12, as set forth heretofore, with or without olefinic hydrocarbons from line 16. In the event that the olefins are not mixed directly with the incoming aromatics they will be added to the alkylator via line 19 as previously described.

In alkylator 12 a pool of catalyst is maintained, the catalyst and reactants flowing countercurrently in the alkylator. Accordingly, the fresh catalyst is added from line 20 to the upper part of the catalyst level in alkylator 12 by opening valve 90 in line 91, valve 21 being closed. Above the catalyst level in alkylator 12 will be found a hydrocarbon layer, together with unreacted olefins and unused hydrogen chloride. The gaseous constituents can be released through line 92 and vented through line 93 and valve 94 or, preferably, recycled by opening valve 95 in line 96 which leads either to olefin input line 16 via line 97 and valve 98, or to the hydrogen chloride input line 13 via valve 99 in line 100 which joins line 75 leading to line 13. The liquid hydrocarbon fraction is withdrawn through line 23 and can be sent directly to fractionator 28 by opening valve 101 in line 102 which joins line 29, valve 25 in line 26 being closed. In the event that catalyst is occluded or dissolved in the hydrocarbon feed stock, it may be desirable to continue to pass it through separator 24 to permit a further settling time for separation of the hydrocarbons from the catalyst. In addition, in order to remove any dissolved aluminum chloride, it may be desirable to insert a cooler 103 in line 26 prior to separator 24, the lower temperature serving to precipitate out the dissolved catalyst, thus permitting catalyst-free hydrocarbons to pass overhead through line 27 to fractionator 28.

The catalyst complex together with the dissolved aromatics is in this case withdrawn from a point near the base of alkylator 12 through line 104 and can be discarded by opening valve 105 in line 106. It can also be recycled directly to alkylator 12 by opening valve 107 in line 108 which joins line 45 leading to catalyst input line 20. It is preferable, however, to recover the dissolved aromatic hydrocarbons from the complex, which can be done by opening valve 109 in line 110 which joins line 34 leading to complex stripper 31 which operates as previously described. The operation of the alkylation system is otherwise comparable to that previously described.

As an example of the operation of our process a feed stock comprising about 70% toluene, the remainder being benzene and paraffinic hydrocarbons is introduced through line 10. From lines 13 and 15 anhydrous hydrogen chloride is injected in an amount such that the aromatic fraction wil contain about 2.5% hydrogen chloride based on the toluene present. The two feed stocks, that is, aromatic-rich hydrocarbons and hydrogen chloride, are mixed at a pressure of about 60 pounds per square inch, and at a temperature of about 110° F. under which condition about 2.5% of the acid gas will be dissolved in the hydrocarbon feed. An olefin feed stock, which can suitably be gases from the cracking of petroleum hydrocarbons fractionated to yield a light gas fraction containing about 10% ethylene together with various quantities of methane, ethane, hydrogen and probably small amounts of propane due to the imperfect fractionation is added through lines 16 and 11 and valve 17. The feed streams are desirably heated to the reaction temperature of 212° F. in a heater (not shown) and directed into alkylator 12 which is partially filled with an aluminum chloride-isooctane complex of the type previously described. Reactor 12 is maintained at a temperature of 212° F. by means of a steam jacket held at the proper pressure so that the contents of the reactor are at the reaction temperature. A stirrer can be inserted in alkylator 12 but ordinarily this is not necessary since the passage of the olefins and the reacting aromatic hydrocarbons through the catalyst pool causes sufficient agitation to bring about a reaction between them. The reactor is maintained at a pressure of 200 pounds per square inch. From reactor 12 the normally liquid hydrocarbons together with the normally gaseous hydrocarbons and hydrogen chloride pass through line 23, valve 25, line 26 and cooler 103 to separator 24 wherein a separation is made between the catalyst and the hydrocarbon. The feed stock entering separator 24 has preferably been cooled to about 100° F. in cooler 103 without substantial reduction in pressure except that occasioned by the pressure drop in the pipe and by the decrease in temperature. The complex is withdrawn through line 30 and directed partly through valve 43 and line 44 to line 45 which returns it to alkylator 12 via line 20, valve 90 and line 91. The remainder is directed through valve 32, and line 33 to line 34 leading to complex stripper 31 wherein the aromatics dissolved in the complex are removed. Stripper 31 is maintained at about or a little above the boiling point of the ethyl toluene which is formed during the alkylation reaction. The stripper is also maintained at substantially atmospheric pressure and as low temperatures are employed as is feasible for the recovery of the aromatic hydrocarbons. In case it appears desirable we can operate complex stripper 31 at a pressure of about one hundred millimeters and at a temperature of about 110° F. in order to remove the aromatic hydrocarbons. The stripped complex is removed by line 47 and recycled by opening valve 52 in line 45 which returns the complex to alkylator 12.

The alkylated aromatics, unalkylated aromatics and any other hydrocarbons dissolved in the complex pass overhead to line 36 and through valve 39 in line 40 to line 29 where they join the hydrocarbon products from separator 24, the entire stream being directed to fractionator 28. Fractionator 28, which is maintained under the usual conditions of temperature and pressure for the separation of various boiling fraction hydrocarbons is so regulated that the lightest gases, including hydrogen chloride and ethane, pass overhead through line 66. A part or all can be recycled, but generally with an olefin feed of the type described herein it is desirable to vent the gases through line 68 and to recover the hydrogen chloride therefrom either by scrubbing or by other means. The light aromatics which were not alkylated during the reaction in alkylator 12 are withdrawn as a side stream via line 76 and although they can be recovered as such from line 77 we prefer to recycle them to the alkylation reactor by opening valve 79 in line 80 which joins line 10. Heavy aromatics are withdrawn through line 82 and discarded from the system by opening valve 83 in line 84. The desired alkylated aromatics, which will be ethyl toluene, are recovered from line 81 for their proper use.

As an example of our process, 815 parts by weight of tolene was charged to a reactor together with 10 mols (280 parts by weight) of ethylene under a hydrogen chloride pressure of about 130 pounds per square inch, employing an aluminum chloride-isooctane complex prepared as previously described. The ethylene was added at such a rate as to maintain a pressure of 200 pounds per square inch in the reactor. The temperature was maintained at about 212° F. for a total period of 1.6 hours. Stirring of the reactants was continued throughout the reaction period. 903 parts by weight of liquid was obtained of which 43% was ethyl toluene; the remaining hydrocarbons included 23% unreacted toluene, 11% ethyl benzene and xylene, and the remainder such higher alkylated products as diethyl benzene, dimethyl ethyl benzene, diethyl toluene, etc., as well as 3.7% low boiling products. It will be noted from the above that the monoalkyl aromatic hydrocarbon was the principal product, the total higher members being less than 20%. This is indeed remarkable when the activity of the toluene is considered and the ease with which polyalkylated aromatics are formed using the usual aluminum halide catalysts.

One explanation for this higher yield is as follows: using anhydrous aluminum chloride as a catalyst, the aluminum chloride forms a complex with the toluene and the ethylene preferably alkylates the attached toluene. If an aluminum halide-aromatic hydrocarbon complex is employed the same is true, i. e., the ethylene preferably alkylates the attached aromatic hydrocarbon. The exchange of the attached alkylated aromatic for the unalkylated, unattached aromatic is slow so that a relatively high percentage of polyalkylated aromatics results. On the other hand, when using an aluminum chloride-paraffinic hydrocarbon complex as the catalyst, there is no aromatic hydrocarbon attached to the catalyst, so that all of the aromatic hydrocarbons have equal opportunity for alkylation and consequently a higher yield of the monoethyl aromatic results.

An additional advantage for our catalyst over anhydrous aluminum chloride or aluminum chloride-aromatic complex is the fact that aromatics are practically quantitatively soluble in the complex. Since this is true, the possibility of homogeneous catalysis is much greater permitting more intimate contact between the aromatics and the olefins with greater conversion of the reactants to the desired alkalate. It also permits the use of simple reactors without stirrers or other means of mechanical agitation necessary to insure intimate mixing of the feed stocks. Since the catalyst is a selective solvent for aromatic hydrocarbons it is quite feasible and advantageous to use our complex catalyst for the alkylation of aromatic hydrocarbons which are present in a mixed aromatic-paraffinic hydrocarbon feed. The paraffinic hydrocarbons will pass through the reaction unconverted and unchanged while the aromatic hydrocarbons will be converted to the alkylate. This permits the use of straight-run naphthas containing various amounts of aromatic hydrocarbons as for example, 20% benzene and toluene, which is not ordinarily possible when using the previously described aluminum halide type complexes in alkylation.

We do not intend, however, to be bound by any particular theory of the mechanism of the reaction, since it is sufficient to know that by employing our preferred complex as a catalyst for the alkylation of aromatics with normally gaseous olefins a much increased yield is obtained per unit volume of catalyst and the reaction proceeds easily and steadily with long catalyst life and without the production of undesirable by-products such as polymers, polyalkylated aromatics, etc. Previous attempts to equal this effect using an aluminum halide catalyst, either in anhydrous form or in the form of an aromatic or olefinic complex, have yielded much less monoalkylate product and the catalyst itself was much more quickly deactivated to a point where it was necessary to discard the catalyst.

Although we have illustrated a preferred embodiment of our invention by the use of ethylene and toluene, it is to be understood that the invention is by no means limited to these reactants but includes the use of other benzene homologs, as well as benzene itself, and other gaseous olefinic hydrocarbons, including those having three and four carbon atoms per molecule. Moreover, while we have shown a preferred arrangement of apparatus for carrying out our process, it should be understood that this is by way of illustration only, and not by way of limitation. Various details have been omitted from the drawing for the sake of simplicity, including such well-known expedients as pumps, automatic control valves, heat-exchange systems, etc. all of which would be utilized in a plant employing our process and the necessity for which will be readily understood by one skilled in the art.

We claim:

1. The process for the production of alkylated aromatic hydrocarbons which comprises contacting at least one aromatic hydrocarbon with at least one normally gaseous olefin in the presence of an aluminum halide-paraffinic hydrocarbon complex at a temperature and pressure effective for promoting the alkylation of said aromatic hydrocarbon with said olefin under the catalytic influence of said complex.

2. The process for the production of alkylated aromatic hydrocarbons which comprises contacting at least one aromatic hydrocarbon with at least one normally gaseous olefin in the presence of an aluminum halide-paraffinic hydrocarbon complex and a substance affording a hydrogen halide under the reaction conditions at a temperature within the range from about 50° F. to about 250° F. and under superatmospheric pressure for a period of time sufficient to promote the alkylation of said aromatic hydrocarbons with said olefins.

3. The process for the production of alkylated aromatic hydrocarbons which comprises contacting a fraction rich in at least one aromatic hydrocarbon with a fraction rich in at least one normally gaseous olefin in the presence of an aluminum halide-paraffinic hydrocarbon complex and a substance affording a hydrogen halide under the reaction conditions at a temperature within the range from about 50° F. to about 250° F. and under a pressure within the range from about 15 to about 600 pounds per square inch for a period of time sufficient to promote the alkylation of said aromatic hydrocarbon with said olefin.

4. The process according to claim 3 in which said aluminum halide-paraffinic hydrocarbon complex is an aluminum chloride paraffinic hydrocarbon complex, and said hydrogen halide is hydrogen chloride.

5. The process for the production of monoalkylated aromatic hydrocarbons which comprises contacting a fraction rich in at least one aromatic hydrocarbon with ethylene in the presence of an aluminum chloride-paraffinic hydrocarbon complex and a substance affording hydrogen chloride under the reaction conditions at a temperature within the range from about 50° F. to about 250° F. and under superatmospheric pressure, separating the reaction products and unreacted hydrocarbons from said complex, and recovering from said separated products monoethylated aromatic hydrocarbons.

6. The process according to claim 5 in which the temperature is within the range from about 175° F. to about 215° F. and said superatmospheric pressure is less than 600 pounds per square inch.

7. The process for the production of ethyl toluene which comprises contacting toluene and ethylene in the presence of an aluminum chloride-paraffinic hydrocarbon complex and hydrogen chloride at a temperature within the range from about 175° F. to about 215° F. at a pressure within the range from about 15 to about 600 pounds per square inch, and recovering therefrom a fraction rich in ethyl toluene.

8. The process for the production of ethylated aromatic hydrocarbons which comprises contacting a fraction rich in toluene with a light gas fraction containing at least 10% of ethylene in the presence of an aluminum chloride-isooctane complex and hydrogen chloride at a temperature of about 212° F. and at a pressure of about 200 pounds per square inch, separating a hydrocarbon fraction from said complex by stratification, and recovering ethylated aromatics from said last mentioned hydrocarbon fraction by fractionation.

9. A process for the production of alkylated aromatic hydrocarbons which comprises contacting a fraction rich in at least one aromatic hydrocarbon and a fraction rich in at least one normally gaseous olefin with a liquid aluminum chloride-paraffinic hydrocarbon complex and a substance affording a hydrogen halide under the reaction conditions, at a temperature and pressure effective for promoting the alkylation of said aromatic hydrocarbon with said olefin, separating reaction products and unreacted hydrocarbons from said complex, fractionating said separated products into a fraction rich in mono-alkylated aromatics, a fraction rich in hydrocarbons lighter than said mono-alkylated aromatics and a fraction rich in hydrocarbons heavier than said monoalkylated aromatics, recovering dissolved aromatic hydrocarbons from said complex and directing said recovered aromatics to said fractionation step, and returning unalkylated aromatics to said contact step.

EDMOND L. D'OUVILLE.
BERNARD L. EVERING.